United States Patent [19]
Ueda

[11] Patent Number: 5,162,844
[45] Date of Patent: Nov. 10, 1992

[54] IMAGE PROJECTION APPARATUS
[75] Inventor: Toshihiko Ueda, Toyokawa, Japan
[73] Assignee: Minolta Camera Co., Ltd., Osaka, Japan
[21] Appl. No.: 704,820
[22] Filed: May 23, 1991
[30] Foreign Application Priority Data May 30, 1990 [JP] Japan ................................ 2-141035

[51] Int. Cl.$^5$ .............................................. G03B 27/54
[52] U.S. Cl. ...................................... 355/67; 359/708; 359/742
[58] Field of Search ................... 355/67; 359/708, 742

[56] References Cited

U.S. PATENT DOCUMENTS

| | | |
|---|---|---|
| 2,787,935 | 4/1957 | Inoue . |
| 4,029,956 | 6/1977 | Leibundgut et al. . |
| 4,278,334 | 7/1981 | Maeda . |
| 4,433,906 | 2/1984 | Nakatani et al. . |
| 4,475,796 | 10/1984 | Kimura ................... 359/642 |
| 4,825,243 | 4/1989 | Ito et al. . |
| 4,906,080 | 3/1990 | Omata ..................... 359/708 |
| 5,046,838 | 9/1991 | Iwasaki ................... 359/742 |

FOREIGN PATENT DOCUMENTS 62-287202 12/1987 Japan .

Primary Examiner—Monroe H. Hayes
Attorney, Agent, or Firm—Price, Gess & Ubell

[57] ABSTRACT

An image projection apparatus including a projection lens system projecting an image of a transparent original onto an image receiving surface with a variable magnification and an illumination system illuminating the original. The projection lens system includes a plurality of projection lenses of different magnifications in an interchangeable manner or a zoom lens. The illumination system including a light source unit, a divergent lens unit and a convergent aspherical lens unit so that Kohler illumination can be realized in any magnification. A refracting power of the convergent aspherical lens unit becomes smaller than a spherical lens unit with an increase in a distance from an optical axis. The convergent aspherical lens unit may be includes a Fresnel lens.

18 Claims, 4 Drawing Sheets

IMAGE PROJECTION APPARATUS

BACKGROUND OF THE INVENTINO

1. Field of the Invention

The present invention relates to image projection apparatus, and more particularly to image projection apparatus, such as microfilm readers, microfilm reader-printers and overhead projectors, wherein Kohler illumination is used.

2. Description of the Related Art

Image projection apparatus, such as microfilm readers, microfilm reader-printers and overhead projectors, comprise an illumination system for illuminating originals (films), and a projection lens for projecting an image of the illuminated original on an image receiving surface. Such image projection apparatus realize Kohler illumination for concentrating the light from a light source on the pupil position of the projection lens to achieve a higher illumination efficiency.

On the other hand, in the case where the magnification of projection is to be altered according to the size of originals, one projection lens is changed for another projection lens of different focal length if the lenses are single-focus lenses. Alternatively, when the projection lens is a zoom lens, the magnification of projection is variable by zooming. In the former case, Kohler illumination can be accomplished at any magnification of projection by employing projection lenses of different focal lengths which have the same pupil position. In the latter case, the same can be realized insofar as the pupil position remains unchanged despite zooming. However, when the projection lenses are to be so constructed, designing the lens involves a great limitation and therefore entails the problem that the projection lens increases in the number of component lenses and becomes costly.

To fulfill the requirement for Kohler illumination at any magnification, an arrangement is known wherein the condenser lens is movable along the optical axis. The condenser lens is moved along the optical axis manually or automatically, whereby the position for the lens to converge the light from the light source is altered according to the magnification. This arrangement nevertheless requires a mechanism for moving the condenser lens, consequently giving rise to the problem of making the image projection apparatus larger and complex in construction. Additionally, the condenser lens, if manually movable, must be manipulated by the operator and therefore poses a problem as to the ease of handling.

SUMMARY OF THE INVENTION

Accordingly, the main object of the present invention is to provide an image projection apparatus wherein the illumination system is adapted to meet the requirement for Kohler illumination without including any movable portion.

Another object of the invention is to provide a compact image projection apparatus which is simplified in construction.

Another object of the invention is to provide an image projection apparatus for giving uniform illuminance to the image receiving surface.

BRIEF DESCRIPTION OF THE DRAWINGS

These and other objects or features of the present invention will become apparent from the following description of a preferred embodiment thereof taken in conjunction with the accompanying drawings, in which.

In the following description, like parts are designated by like reference numbers throughout the several drawings.

DESCRIPTION OF THE PREFERRED EMBODIMENT

An embodiment of the present invention will be described below with reference to the drawings.

Figure 1:
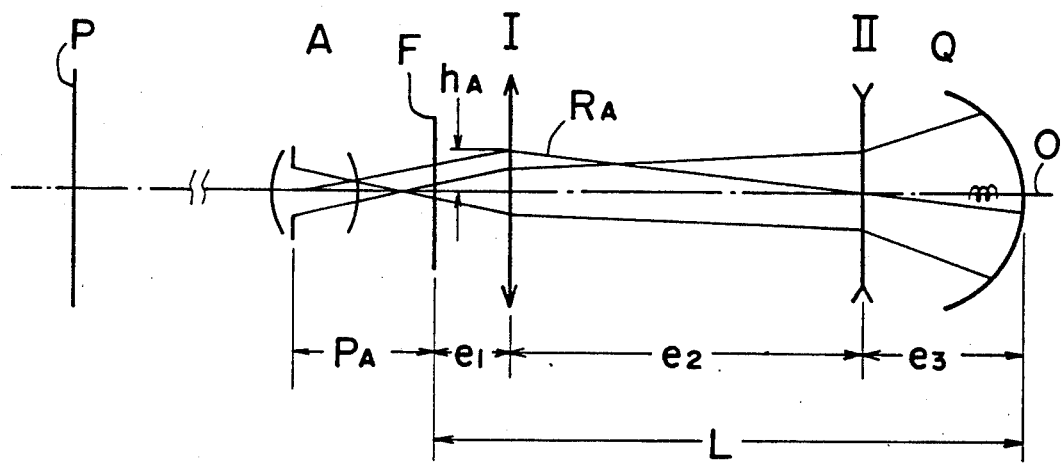
FIG. 1 is a diagram showing the optical path of a microfilm reader embodying the invention and as set to a high magnification.
Figure 2:
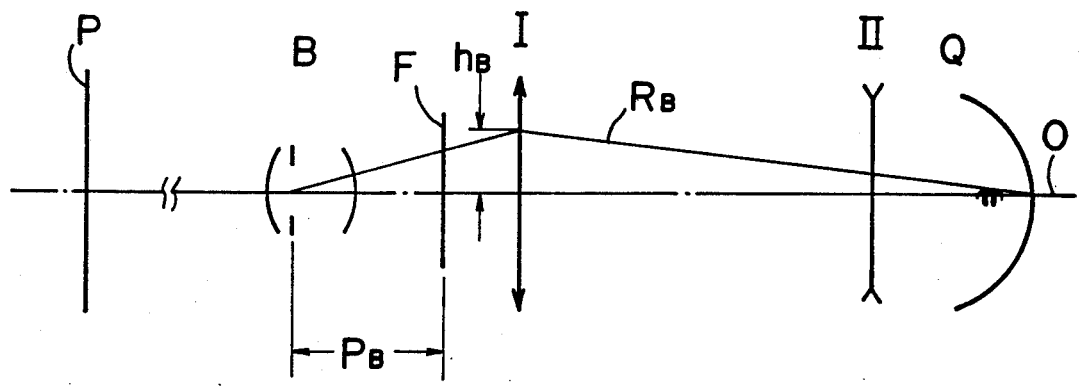
FIG. 2 is a diagram showing the optical path of the microfilm reader shown in FIG. 1 as set to a medium magnification.
Figure 3:
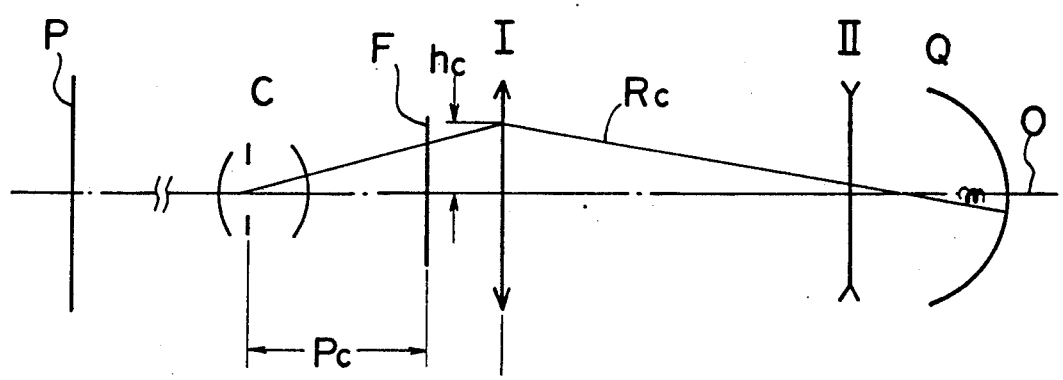
FIG. 3 is a diagram showing the optical path of the microfilm reader shown in FIG. 1 as set to a low magnification.

FIGS. 1, 2 and 3 show the optical path of a microfilm reader embodying the invention and set to a high magnification (46×), medium magnification (29×) and low magnification (18×), respectively. The microfilm reader has, as arranged from the enlarged side (left side) toward the other side, a screen P providing an image receiving surface, interchangeable projection lens A, B or C, film F as a transparent original, convergent aspherical lens I, divergent lens II, and light source unit Q comprising a lamp and a reflecting mirror. The illumination system of the reader comprises the convergent aspherical lens I, divergent lens II and light source unit Q. The convergent aspherical lens I has aspherical characteristics such that the refracting power of the lens becomes smaller than spherical lenses with an increase in the distance from the optical axis 0. The projection lenses A, B and C have a relatively great aperture efficiency. One of the three projection lenses A, B and C is mounted on the microfilm reader to obtain the desired magnification of projection. The light source unit Q emits a bundle of convergent rays, which is guided by the lenses I and II onto the film F to illuminate the film F. An image of the illuminated film F is projected on the screen P by the projection lens.

A comparison between FIGS. 1, 2 and 3 shows that from the film F, the pupil position $P_B$ of the medium-magnification projection lens B is at a larger distance than the pupil position $P_A$ of the high-magnification projection lens A, and the pupil position $P_C$ of the low-magnification projection lens C is at a larger distance thanthe pupil position $P_B$ of the medium-magnification projection lens B. According to the present embodiment, these lenses can be different in pupil position at the respective magnifications of projection without objection. To give the coincident pupil position to these lenses at the different magnifications imposes a great limitation on the design of the lenses and is therefore undesirable. If the lenses are allowed to have different pupil positions at the different magnifications as in the present embodiment, the lenses can be reduced in the number of component lenses.

Next, a description will be made of the action of the convergent aspherical lens I included in the illumination system.

The convergent aspherical lens I guides the rays emanating from the light source unit Q to the pupil position of the projection lens and serves the function of fulfilling the requirement for Kohler illumination. When the rays are traced from the enlarged side in the reverse direction, the off-axis principal ray $R_A$ emergent from the pupil position $P_A$ of the projection lens A is caused to intersect the optical axis O in the vicinity of the divergent lens II by the refracting power of the lens I as shown in FIG. 1. This permits the off-axis rays to contribute to illumination to thereby render the illuminance on the screen uniform.

Suppose the object distance S is given by the following equation based on the position of the convergent aspherical lens I.

$$S = P_A + e_1$$

where
$e_1$: calculated distance between the film F and the lens I

Since the rays passing through the lens I is paraxial in the case of the high-magnification projection lens A, the image distance S' is expressed by:

$$S' = f_1(1 - \beta_A)$$

where
$f_1$: focal length of the convergent aspherical lens I
$\beta_A$: A lateral magnification of the projection lens A (reciprocal of the magnification, a negative value)

On the other hand, the object distance S can be expressed by:

$$S = P_A + e_1 = f_1(1 - 1/\beta_A)$$

The lateral magnification $\beta_A$ is therefore expressed by:

$$\beta_A = f_1/(f_1 - S)$$

Accordingly, the image distance S' is given by:

$$S' = S \cdot f_1/(S - f_1) = (P_A + e_1) \cdot f_1/(P_A + e_1 - f_1)$$

When this image distance S' is a value approximate to the calculated distance $e_2$ between the lens I and the lens II, the requirement for Kohler illumination can be fulfilled.

More specifically, it is desired that the following expression (a) be satisfied.

$$0.7 e_2 < (P_A + e_1) \cdot f_1/(P_A + e_1 f_1) < 1.3 e_2 \quad (a)$$

If the upper and lower limit values of this expression (a) are exceeded, the off-axis rays will be astray from the light source unit Q, failing to make the illuminance on the screen unifrom.

When the medium-magnification projection lens B or the low-magnification projection lens C is used as seen in FIG. 2 or 3, the refracting power of the lens I also causes the off-axis principal ray $R_B$ or $R_C$ to intersect the optical axis O in the vicinity of the light source unit Q or the divergent lens II. This is required to cause the off-axis rays to contribute to illumination to thereby render the illuminance on the screen uniform.

It is assumed that when the projection lens A, B or C is used, the off-axis principal ray $R_A$, $R_B$ or $R_C$ remotest from the optical axis passes through the convergent aspherical lens I at a position (height) $h_A$, $h_B$ and $h_C$, respectively. These positions are in the following relationship.

$$h_C < h_B < h_A$$

Figure 4:
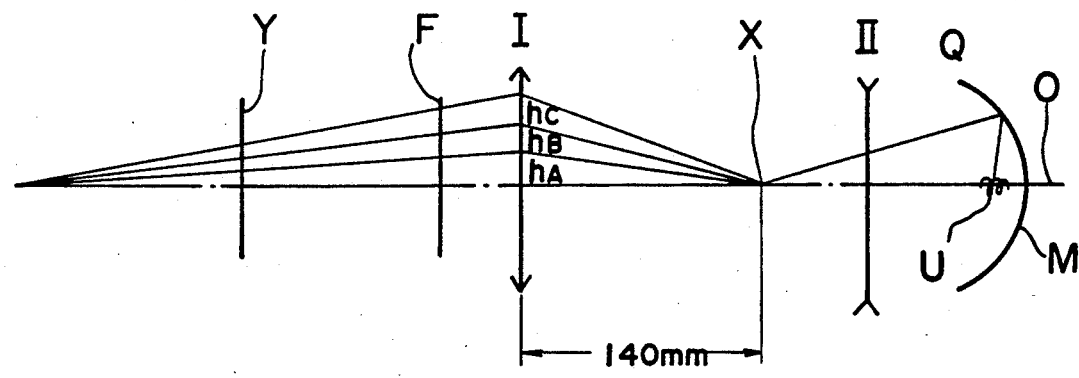
FIG. 4 is a diagram for illustrating the action of a convergent aspherical lens included in the microfilm reader shown in FIG. 1.

When the position X where the rays from the light source unit Q converge is the object point, the off-axis ray $R_A$, $R_B$ or $R_C$ is led to the pupil position $P_A$, $P_B$ or $P_C$ through the position $h_A$, $h_B$ or $h_C$, respectively. When the rays passing through the position $h_A$, $h_B$ and $h_C$ with the ray converging position X serving as the object point are checked for spherical aberration at a paraxial image surface Y as seen in FIG. 4, it is found that the spherical aberration increases in the positive direction as the height increases from $h_A$ to $h_B$ and then to $h_C$.

Accordingly, the convergent aspherical lens I has such aspherical characteristics that the lens becomes smaller in refracting power than spherical lenses with an increase in the distance from the optical axis. Owing to the aspherical characteristics, Kohler illumination can be accomplished at all times despite the difference in pupil position at the respective magnifications of projection.

Usable as the convergent aspherical lens I is a Fresnel lens having an inner portion close to the optical axis, and an outer portion remote from the optical axis and having a smaller refracting power than the inner portion. The lens I is so constructed that when the rays are traced from the enlarged side in the reverse direction, the lens causes the principal ray through the low-magnification projection lens to pass through the outer portion of the lens I and the principal ray through the high-magnification projection lens to pass through the inner portion of the lens I for these rays to intersect the optical axis O in the vicinity of the light source unit Q or the divergent lens II.

Figure 5:
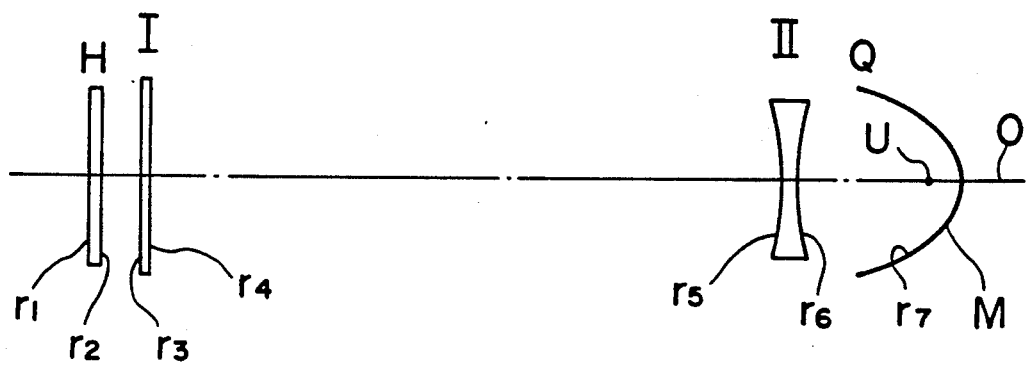
FIG. 5 is a diagram specifically showing the construction of illumination system of the microfilm reader shown in FIG. 1.

FIG. 5 is a diagram showing the specific construction of an illumination system wherein such a Fresnel lens is used as the convergent aspherical lens I. A bundle of rays emitted by a lamp U is converged by a reflecting mirror M and incident on a divergent lens II. The rays through the divergent lens II pass through the Fresnel lens I and illuminate a film on a film holder (plain plate) H. This illumination system has the specific numerical values listed in TABLE 1.

TABLE 1

| | Radius of curvature | Axial distance | | Refractive index | |
|---|---|---|---|---|---|
| $r_1$ | ∞ | | | | |
| | | $d_1$ | 3.0 | $N_1$ | 1.52 |
| $r_2$ | ∞ | | | | |
| | | $d_2$ | 9.0 | | |
| $r_3$ | ∞ | | | | |
| | | $d_3$ | 2.0 | $N_2$ | 1.49 |
| $r_4$* | (TABLE 2) | | | | |
| | | $d_4$ | 146.0 | | |
| $r_5$ | −50.0 | | | | |
| | | $d_5$ | 3.0 | $N_3$ | 1.53 |
| $r_6$ | 50.0 | | | | |
| | | $d_6$ | 38.0 | | |
| $r_7$* | −15.0 | | | | |
| | | $d_7$ | −8.0 | | |
| U | — | | | | |
| | | Σd | 193.0 | | |

Figure 6:
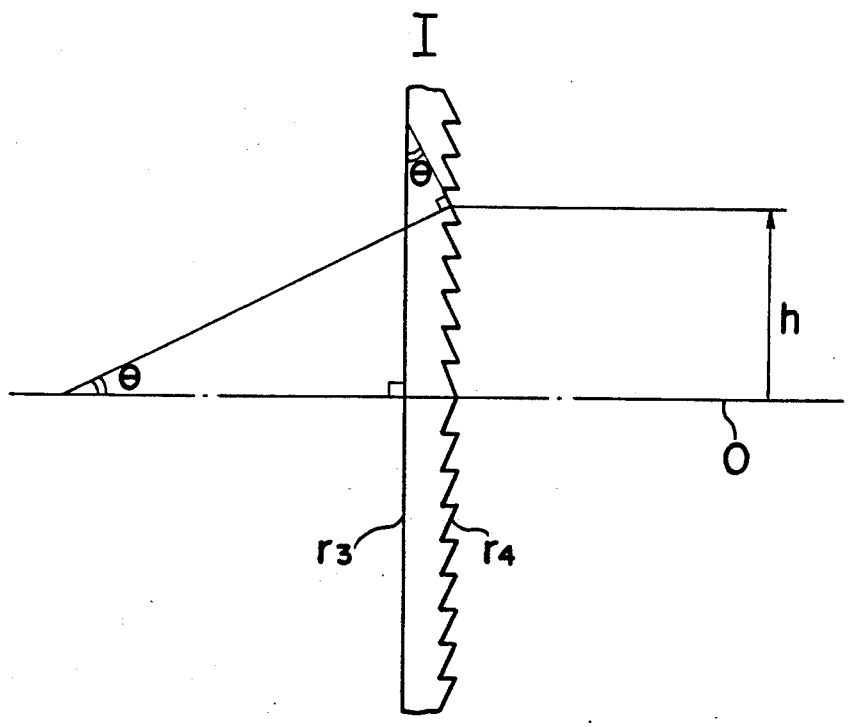
FIG. 6 is a diagram showing the construction of a Fresnel lens.

The reflecting surface $r_7$ shown in TABLE 1 has an aspherical coefficient $\epsilon$ of 0.41. This aspherical coefficient $\epsilon$ is defined by the following equation:

$$x = (\phi^2/Cr)/(1 + (1 - \epsilon(\phi^2/Cr^2))^{\frac{1}{2}})$$

where x: displacement in the axial direction $\phi$: displacement in a direction perpendicular to the optical axis Cr: radius of curvature of the surface at its top Next, described below is the construction of the Fresnel surface r4 of the Fresnel lens I having the aspherical characteristics. To simplify the process for producing the Fresnel lens I, the lens is in the form of an assembly having a saw-toothed section and comprising a multiplicity of minute annular prisms. The Fresnel surface r4 is therefore defined by the angle of inclination $\theta$ at a height h from the optical axis as shown in FIG. 6. TABLE 2 shows the values for the inclination angle $\theta$ at an interval of 2 mm. The inclination angle $\theta$ varies continuously also from interval to interval.

TABLE 2

| h (mm) | $\theta$ (deg) |
|---|---|
| 0 | 0 |
| 2 | 7.4 |
| 4 | 14.5 |
| 6 | 20.8 |
| 8 | 26.0 |
| 10 | 30.2 |
| 12 | 33.6 |
| 14 | 36.6 |
| 16 | 39.3 |
| 18 | 42.3 |

The Fresnel surface r4 is designed for the off-axis principal rays $R_A$, $R_B$ and $R_C$ to pass through the Fresnel lens I at the heights $h_A$, $h_B$ and $h_C$ which are 7.0 mm, 9.0 mm and 14.5 mm, respectively. The inner portion, intermediate portion and outer portion differ in refracting power in corresponding relation to the respective heights.

Figure 7:
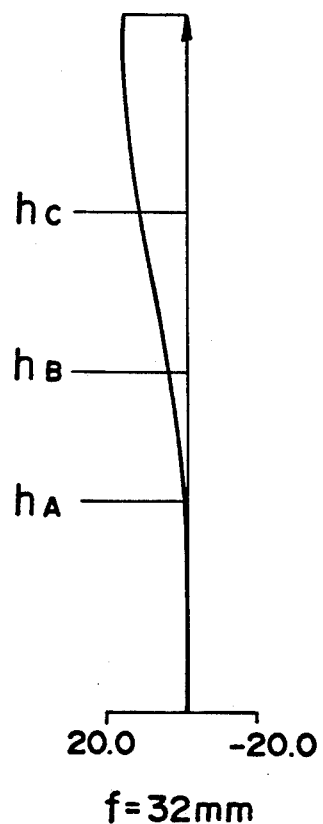
FIG. 7 is an aberration curve diagram of the illumination system shown in FIG. 5.

FIG. 7 shows the spherical aberration curve of the illumination system when the focal length of the convergent aspherical lens I is 32.0 mm and the distance between the ray converging position X and the lens I is 140 mm.

The distances between the elements calculated as the distances between the respective principal planes are listed in TABLE 3, wherein L is the distance (calculated distance) between the film F and the light source unit Q, $e_1$ is the distance (calculated distance) between the film F and the lens I, $e_2$ is the distance (calculated distance) between the lens I and the lens II, $e_3$ is the distance (calculated distance) between the lens II and the light source unit Q, $f_1$ is the focal length of the lens I and $f_2$ is the focal length of the lens II.

TABLE 3

| L: | 187.3 (mm) | $e_1$: | 12.3 (mm) |
|---|---|---|---|
| $e_2$: | 147.0 (mm) | $e_3$: | 28.0 (mm) |
| $f_1$: | 32.0 (mm) | $f_2$: | −47.0 (mm) |

It is also assumed that the projection lenses A, B, C have lateral magnifications $\beta_A$, $\beta_B$, $\beta_C$, focal lengths $f_A$, $F_B$, $f_C$, f-numbers FNo. A, FNo. B, FNo. C and pupil positions $P_A$, $P_B$, $P_C$, respectively. TABLE 4 shows these values.

TABLE 4

| $\beta_A$: | −1/46 | $\beta_B$: | −1/29 |
|---|---|---|---|
| $\beta_C$: | −1/18 | | |
| $f_A$/FNo. A: | 18.5/3.3. | | |
| $f_B$/FNo. B: | 28.5/5.3 | | |
| $f_C$/FNo. C: | 45/6.9 | | |
| $P_A$: | 27.9 (mm) | $P_B$: | 29.3 (mm) |
| $P_C$: | 37.9 (mm) | | |

The divergent lens II is positioned in the vicinity of the focus of the light-covering light source unit Q to convert a bundle of rays emanating from the ligth source unit Q and having a great solid angle to a bundle of rays having a small solid angle corresponding to the f-number of the reduction side of each projection lens system. Since the lens II is disposed close to the light source unit Q, it is desirable to prepare the lens from a heat-insulating glass for attenuating near infrared rays.

Although one of three different projection lenses is intechangeably mounted on the image projection apparatus according to the present invention, a larger number of projection lenses may be provided interchangeably, or the projection lens may alternatively be a zoom lens.

Furthermore, the convergent aspherical lens I can be replaced by a convergent aspherical lens group comprising a plurality of lenses, at least one of which is aspherical. A divergent lens groups comprising a plurality of lenses can also be used instead of the divergent lens II.

As will be apparent from the foregoing description, Kohler illumination can be realized with the projection apparatus of the present embodiment without any need to adjust the elements of the illumination system when to give an altered magnification of projection. This assures uniform illuminance on the screen.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included herein.

What is claimed is:

1. An image projection apparatus comprising:

projection means for projecting an image of a transparent original onto an image receiving surface with a variable magnification, and illumination means for illuminating the original, the illumination means including a light source unit, a divergent lens unit, and a convergent aspherical lens unit in order from a reduction side, so that Kohler illumination can be realized in any magntification, wherein the image projection apparatus satisfies the following expression:

$$0.7e_2 < (P_A + e_1)f_1/(P_A + e_1 - f_1) < 1.3e_2$$

where $f_1$: is a focal length of the convergent aspherical lens unit;

$e_1$: is a calculated distance between the transparent original and the convergent aspherical lens unit;

$e_2$: is a calculated distance between the convergent aspherical lens unit and the divergent lens unit, and $P_A$: is a distance between the transparent original and a pupil position of the projection lens system when the pupil position is at the smallest distance from the transparent original.

2. An image projection apparatus as claimed in claim 1, wherein the projection means includes a plurality of projection lenses of different magnifications.

3. An image projection apparatus as claimed in claim 1, wherein the projection means includes a zoom lens.

4. An image projection apparatus as claimed in claim 1, wherein the light source unit includes a lamp and a concave mirror.

5. An image projection apparatus as claimed in claim 1, wherein the convergent aspherical lens unit comprises a Fresnel lens.

6. An image projection apparatus as claimed in claim 1, wherein the convergent aspherical lens unit causes an off-axis principal ray emergent from a pupil position of the projection means to intersect an optical axis in the vicinity of the divergent lens unit when rays are traced from an enlargment side.

7. An image projection apparatus as claimed in claim 1, wherien a refracting power of the convergent aspherical lens unit becomes smaller than a spherical lens unit with an increase in a distance from an optical axis.

8. An image projection apparatus as claimed in claim 1, wherein the divergent aspherical lens unit is prepared from a heat-insulating glass.

9. An image projection apparatus as claimed in claim 1, wherein the projection means includes a zoom lens and the light source unit includes a lamp and a concave mirror.

10. An image projection apparatus as claimed in claim 9, wherein the convergent aspherical lens unit comprises a Fresnel lens.

11. An image projection apparatus as claimed in claim 9, wherein the convergent aspherical lens unit causes an off-axis principal ray emergent from a pupil position of the projection means to intersect an optical axis in the vicinity of the divergent lens unit when rays are traced from an enlargement side.

12. An image projection apparatus as claimed in claim 9, wherein a refracting power of the convergent aspherical lens unit becomes smaller than a spherical lens unit with an increase in a distance from an optical axis.

13. An image projection apparatus as claimed in claim 10, wherein the divergent aspherical lens unit is prepared from a heat-insulating glass.

14. An illumination system for use in an image projection apparatus in which an image of a transparent original is projected onto an image receiving surface through a projection lens system having a variable magnification, the illumination system comprising:

a light source unit;

a divergent lens unit, and a convergent aspherical lens unit of which a refracting power becomes smaller than a spherical lens unit with an increase in a distance from an optical axis, wherein the illumination system satisfies the following expression:

$$0.7e_2 < (P_A+e_1)f_1/(P_A+e_1-f_1) < 1.3e_2$$

where $f_1$: is a focal length of the convergent aspherical lens unit;

$e_1$: is a calculated distance between the transparent original and the convergent aspherical lens unit;

$e_2$: is a calculated distance between the convergent aspherical lens unit and the divergent lens unit, and $P_A$: is a distance between the transparent original and a pupil position of the projection lens system when the pupil position is at the smallest distance from the transparent original.

15. An illumination system as claimed in claim 14, wherein the light source unit includes a lamp and a concave mirror.

16. An illumination system as claimed in claim 14, wherein the convergent aspherical lens unit comprises a Fresnel lens.

17. An illumination system as claimed in claim 14, wherein the convergent aspherical lens unit causes an off-axis principal ray emergent from a pupil position of the projection lens system to intersect an optical axis in the vicinity of the divergent lens unit when rays are traced from an enlargement side.

18. An illumination system as claimed in claim 14, wherein the divergent aspherical lens unit is prepared from a heat-insulating glass.

* * * * *